US012571449B2

(12) United States Patent
Uchida

(10) Patent No.: US 12,571,449 B2
(45) Date of Patent: Mar. 10, 2026

(54) DAMPER DEVICE

(71) Applicant: NIFCO INC., Yokosuka (JP)

(72) Inventor: Katsutoshi Uchida, Yokosuka (JP)

(73) Assignee: NIFCO INC., Yokosuka (JP)

( * ) Notice: Subject to any disclaimer, the term of this patent is extended or adjusted under 35 U.S.C. 154(b) by 379 days.

(21) Appl. No.: 18/265,354

(22) PCT Filed: Feb. 10, 2022

(86) PCT No.: PCT/JP2022/005329
§ 371 (c)(1),
(2) Date: Jun. 5, 2023

(87) PCT Pub. No.: WO2022/181353
PCT Pub. Date: Sep. 1, 2022

(65) Prior Publication Data
US 2024/0035538 A1 Feb. 1, 2024

(30) Foreign Application Priority Data
Feb. 24, 2021 (JP) ................................. 2021-027046

(51) Int. Cl.
*F16F 9/02* (2006.01)
*F16F 9/36* (2006.01)
*F16J 15/3236* (2016.01)

(52) U.S. Cl.
CPC ............ *F16F 9/0227* (2013.01); *F16F 9/368* (2013.01); *F16J 15/3236* (2013.01)

(58) Field of Classification Search
CPC ................................. F16F 9/368; F16J 15/3236
See application file for complete search history.

(56) References Cited

U.S. PATENT DOCUMENTS

| 4,948,103 | A | | 8/1990 | Bowden et al. | |
| 5,647,578 | A | * | 7/1997 | Bivens ................. | F16F 9/0254 |
| | | | | | 267/221 |

(Continued)

FOREIGN PATENT DOCUMENTS

| EP | 3351820 | A1 | 7/2018 |
| JP | S49-088539 | U | 8/1974 |

(Continued)

OTHER PUBLICATIONS

Extended European Search Report for European Patent Application No. 22759392.8 dated Dec. 20, 2024; 8 pp.

(Continued)

*Primary Examiner* — Nicholas J Lane
(74) *Attorney, Agent, or Firm* — HAUPTMAN HAM, LLP

(57) ABSTRACT

The present invention addresses the problem of stabilizing the state of assembly of a seal member while allowing movement of a piston member in a direction that reduces one space inside a cylinder member with little resistance. The seal member includes a base portion located towards the one space, which is a first space inside the cylinder member, and an extending portion extending from the base portion toward the other space, which is the second space inside the cylinder member. The piston member is provided with a first holding portion that faces the base portion of the sealing member, a second holding portion that faces an extended edge of the extended portion of the sealing member, and a third holding portion that faces a held part formed on the inside of the extended portion of the seal member. A fluid passage is formed in the second holding portion.

5 Claims, 12 Drawing Sheets

(56) References Cited

U.S. PATENT DOCUMENTS

| | | | | |
|---|---|---|---|---|
| 6,119,832 | A | 9/2000 | Hofmann | |
| 2006/0118371 | A1* | 6/2006 | Zimmer | F16F 9/368 |
| | | | | 188/280 |
| 2009/0205485 | A1* | 8/2009 | Zimmer | F16F 9/3228 |
| | | | | 92/8 |
| 2018/0259026 | A1* | 9/2018 | Shimozaki | F16F 9/368 |
| 2021/0062564 | A1* | 3/2021 | Kato | F16F 9/516 |

FOREIGN PATENT DOCUMENTS

| | | | |
|---|---|---|---|
| JP | S54-127988 | U | 9/1979 |
| JP | H02-4036 | U | 1/1990 |
| JP | 2008-032206 | A | 2/2008 |
| JP | 2020037981 | A | 3/2020 |
| WO | 2017/047775 | A1 | 3/2017 |

OTHER PUBLICATIONS

Chinese Patent Office, First Review of the PCT Application for Chinese Patent Application No. 202280014181.6 dated May 29, 2025; 12 pp.
PCT/ISA/210, "International Search Report for PCT International Application No. PCT/JP2022/005329," Apr. 26, 2022.

* cited by examiner

DAMPER DEVICE

FIELD OF THE INVENTION

The present invention relates to a damper device.

BACKGROUND OF THE INVENTION

As a damper device provided with a piston and a cylinder for retaining the piston and causing a braking force based on a movement of the piston, there is a damper disclosed in a following Patent Document 1. In the damper of the Patent Document 1, a seal member having a V-shape in a cross section is fit into a piston to thereby seal between the piston and the cylinder.

PRIOR ART TECHNICAL DOCUMENT

Patent Document

Patent Document 1: Japanese Patent Publication No. 2008-32206.

SUMMARY OF THE INVENTION

Problem to be Solved by the Invention

The main problem that the present invention is to be solved is that in this kind of the damper device, while stabilizing the assembled condition of the seal member as much as possible, a movement of the piston in a direction of reducing one space in the cylinder divided by a piston member is made with a resistance as mall as possible

Means to Solve the Problem

In order to solve the above problem, in a first aspect of the invention, a damper device comprises a piston member, a cylinder member housing the piston member, and a seal member sealing between the piston member and the cylinder member, and provides a braking force by a movement or a relative movement of the piston member, wherein the piston member divides a first space and a second space in the cylinder member, the seal member has an annular shape surrounding the piston member, and includes a base portion located in a first space side of the cylinder member, and an extending portion extending from the base portion to a second space side of the cylinder member, the piston member includes a first holding portion facing the base portion of the seal member, a second holding portion facing an extending end of the extending portion of the seal member, and a third holding portion facing a held portion formed at an inner side of the extending portion of the seal member, and the second holding portion is formed with one or more than two passing portions of the fluid.

In the above structure, at a time of the movement of the piston member in the direction reducing the first space, the base portion of the seal member and the first holding portion are separated, so that it is possible to permit movement of the fluid from the first space to the second space through between the piston member and the seal member. At this time, the extending end of the extending portion of the seal member is held by the second holding portion, and the held portion is held by the third holding portion, respectively, and a situation where an unexpected sliding resistance between the seal member and the cylinder member by deformation of the seal member is prevented as quickly as possible.

On the other hand, since the second holding portion is formed with the passing portion, movement of the fluid from the first space to the second space is smoothly made, and the return movement of the piston can be made with less resistance.

In another aspect of the invention, a dent forming a flow path of the fluid relative to the seal member is formed to continue to the passing portion at a portion between the first holding portion and the second holding portion in the piston member.

In another aspect of the invention, the one space becomes a high pressure at a time that the piston member moves in a direction to reduce the first space.

Advantages of the Invention

In accordance with the invention, while the assemble condition of the seal member is stabilized as much as possible, the movement of the piston member in the direction of reducing the first space in the cylinder member divided by the piston member can be made with less resistance. Namely, in the present invention, it is possible to properly form, so called, one way damper substantially applying a braking force to a braked subject at a time of the forward movement enlarging the first space.

EMBODIMENTS OF THE INVENTION

Hereinafter, typical embodiments of the invention are explained based on FIG. 1 to FIG. 12. The damper device according to the embodiments of the invention provides a braking force to a movement or a relative movement of a piston member 1 forming the damper device, and typically, is assembled with a device provided with a moving part which is a braking target (omitted in a drawing), wherein the damper device applies the braking force to the movement of the braking target, to move the braking target slowly to thereby provide luxury and moderate feeling, or without providing a strange thing.

Figure 1:
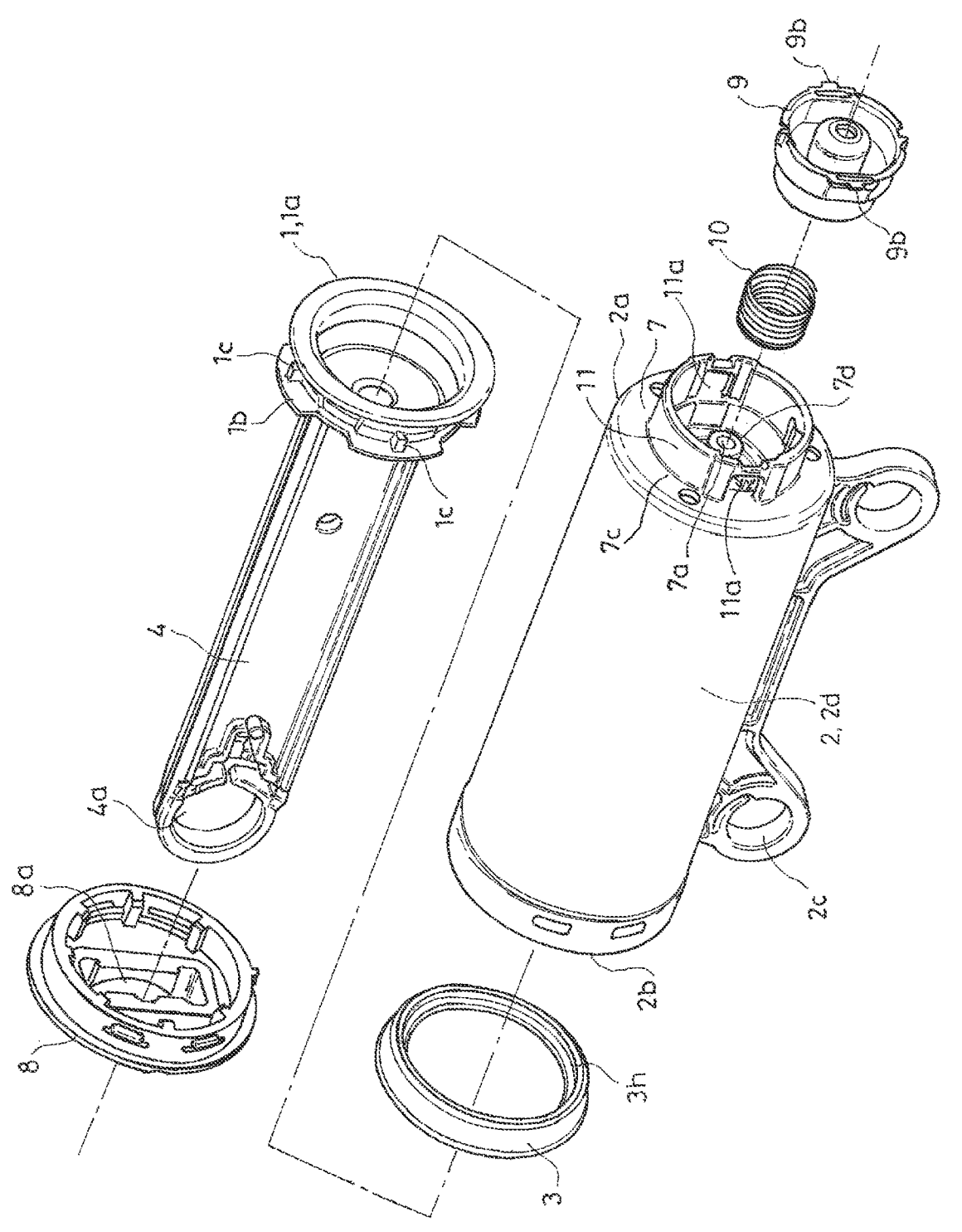
FIG. 1 is an exploded perspective view of a damper device of one embodiment of the invention.
Figure 2:
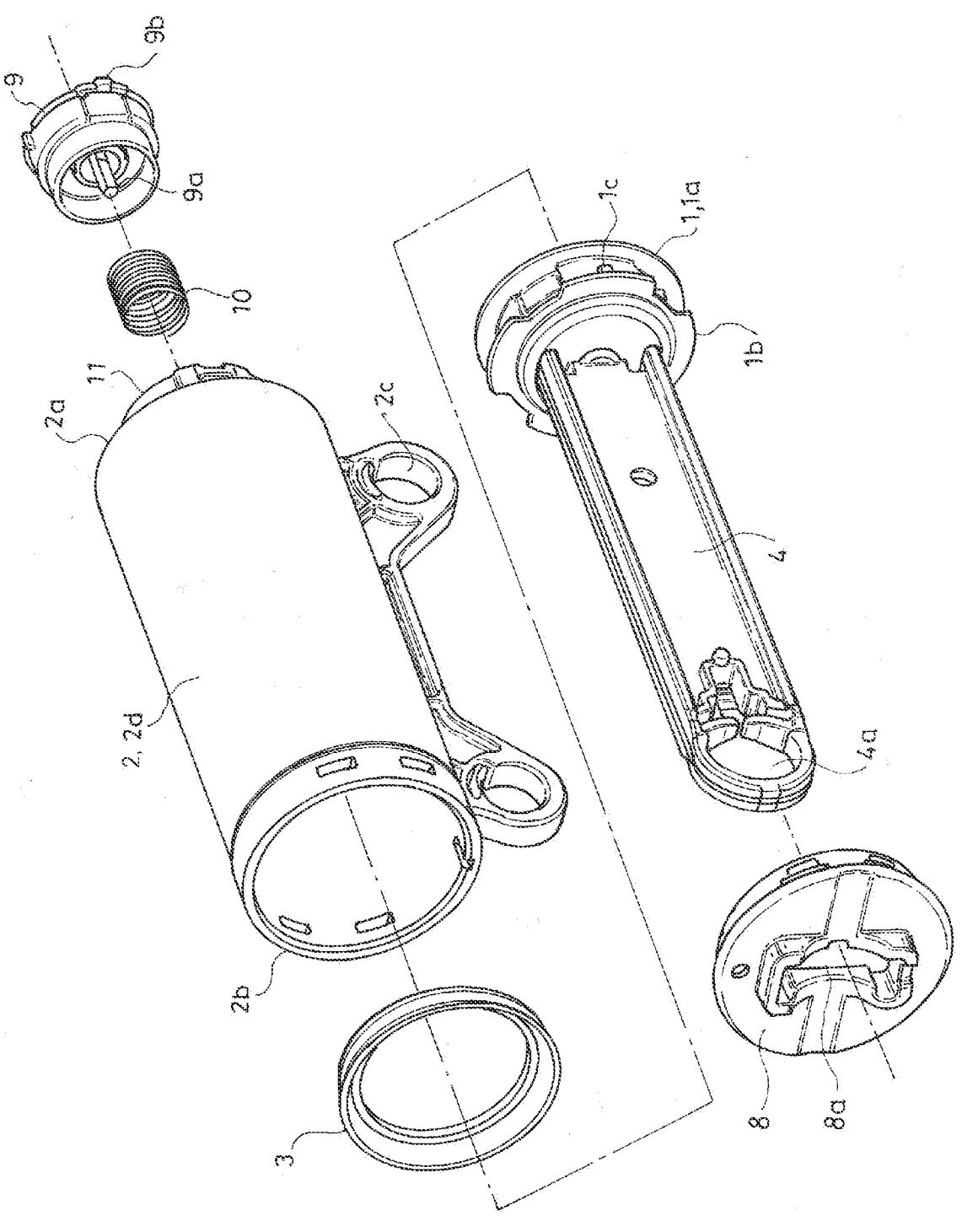
FIG. 2 is an exploded perspective view of the damper device, showing the damper device from a direction different from FIG. 1.

As shown in FIG. 1, the damper device comprises the piston member 1, a cylinder member 2, and a seal member 3 sealing between the piston member 1 and the cylinder member 2.

In the embodiment shown in the drawings, the piston member 1 is integrated with an inner end of a rod member 4. Typically, in the damper device, either one of the rod member 4 and the cylinder member 2 is directly or indirectly connected to the braking target, and the other is directly or indirectly connected to a side movably supporting the braking target, so that the damping apparatus is assembled with the device equipped with the braking target.

(Cylinder Member 2)

In the illustrated embodiment, the above cylinder member 2 is one showing a cylindrical shape. A shape of the cylinder member 2 may be changed as desired, for example as one showing a flat cylindrical shape.

An inside of the cylinder member 2 is divided to one space 5 as a first space, and the other space 6 as a second space (refer to FIG. 5), sandwiching the piston member 1 therebetween. In the illustrated embodiment, one cylinder end 2a of the cylinder member 2 is closed by a wall portion 7 having a passing hole 7a for a fluid in a center thereof. A portion between the piston member 1 and the wall portion 7 operates as the one space 5. On the other hand, the other cylinder end 2b of the cylinder member 2 is closed by a cap 8 having a passing portion 8a for the rod member 4, so that a portion between the piston member 1 and the cap 8 operates as the other space 6.

Figure 10:
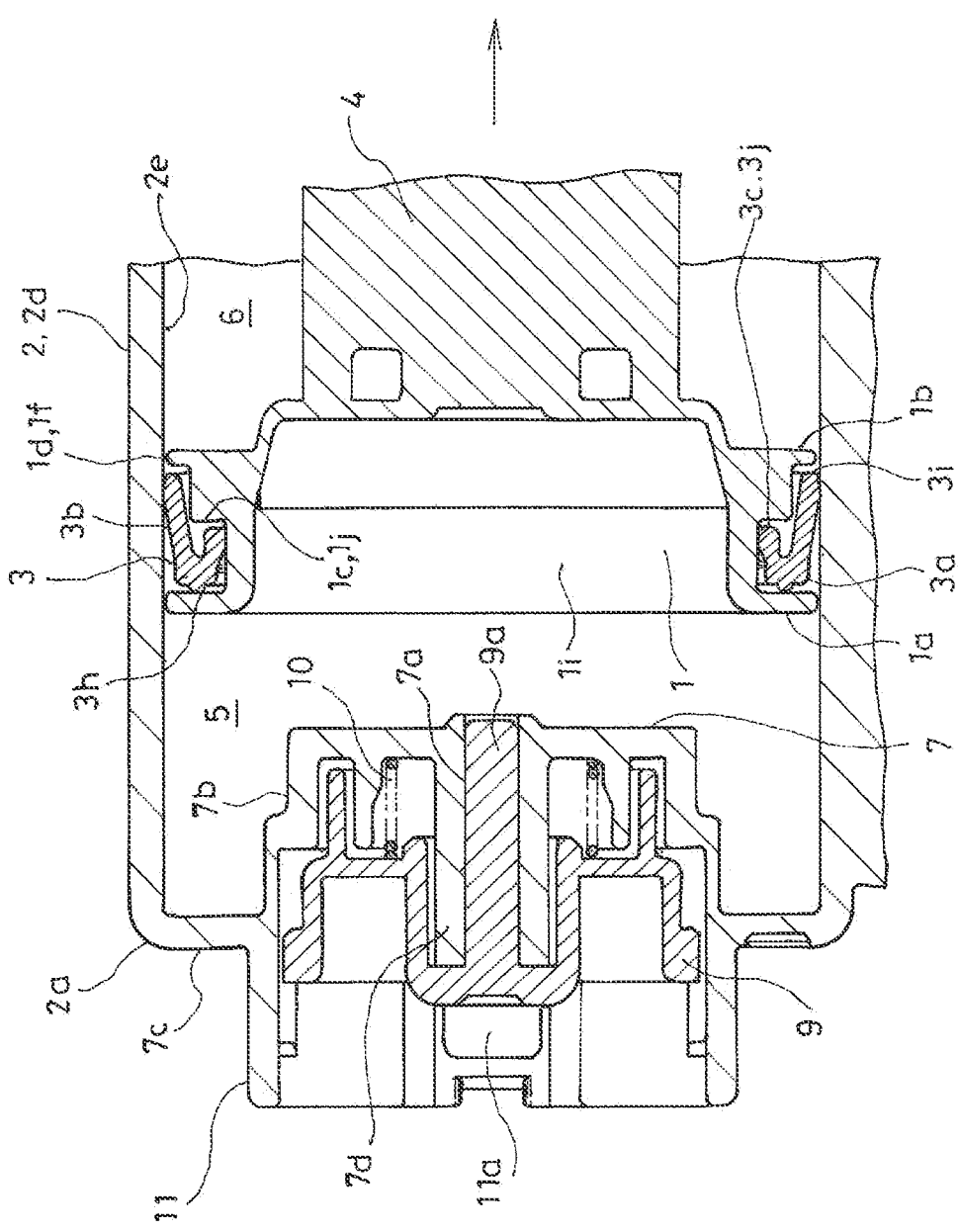
FIG. 10 is a main part sectional view of the damper device, wherein the piston member moves in a direction enlarging the one space.

The wall portion 7 includes a cylindrical projection 7b with an open end positioned on a same plane as the one cylinder end 2a of the cylinder member 2 and the other portion positioned inside the cylinder member 2, and a circumferential face 7c connecting the open end of the cylindrical projection 7b and an edge of the one cylinder end 2a of the cylinder member 2 (refer to FIG. 10). Inside the cylindrical projection 7b, arranged is a conduit 7d with one end integrated with a bottom of the cylindrical projection 7b at a center thereof and projecting to an opening side of the cylindrical projection 7b, to thereby communicate an inside and an outside of the cylinder member 2 through an inside of the conduit 7d. Namely, in the illustrated embodiment, the conduit 7d operates as the passing hole 7a.

Also, in the illustrated embodiment, outside the wall portion 7, a movable member 9 having a shaft portion 9a entering the passing hole 7a is supported to slide in an axial direction of the cylinder member 2. A compression coil spring indicated as numeral 10 is arranged between the movable member 9 and the wall portion 7, and by the spring 10, the movable member 9 is positioned to a base position (a position shown in FIG. 5). Incidentally, indicated by numeral 11 in the drawing is a support portion for the movable member 9 formed outside the wall portion 7, and projections 9b formed at the movable member 9 are placed into windows 11a of the support member 11 (refer to FIG. 1), so that the movable member 9 is movably supported, as above, on the cylinder member 2 within a range of the windows 11a.

A movement of the piston member 1 in the direction of enlarging the one space 5 (hereinafter, the movement of the piston member 1 in this direction is called as a forward movement, and the movement of the piston member 1 in the opposite direction is called as a backward movement) is permitted by a movement of a fluid through the passing hole 7a, in the illustrated embodiment, an air passage through the passing hole 7a.

In the illustrated embodiment, by a pressure change in the one space 5 due to the forward movement of the piston member 1, the movable member 9 is moved, against the urging force of the spring 10, in the direction shortening the distance to the wall portion 7. As the moving amount of the movable member 9 increases larger, an entering amount of the shaft 9a to the passing hole 7a becomes larger, so that passing of the fluid through the passing hole 7a becomes harder, and the forward movement of the piston becomes difficult. Accordingly, in the illustrated embodiment, as the moving speed of the piston member 1 becomes faster, the moving amount of the movable member 9 becomes larger, so that the braking force relative to the movement of the piston 1 becomes greater. Namely, the illustrated damper device operates, so called, as a damper device with a speed response or load response type.

Also, outside the side portion of the cylinder member 2 is formed with a connection portion indicated as numeral 2c for the connection.

(Seal Member 3)

Figure 5:
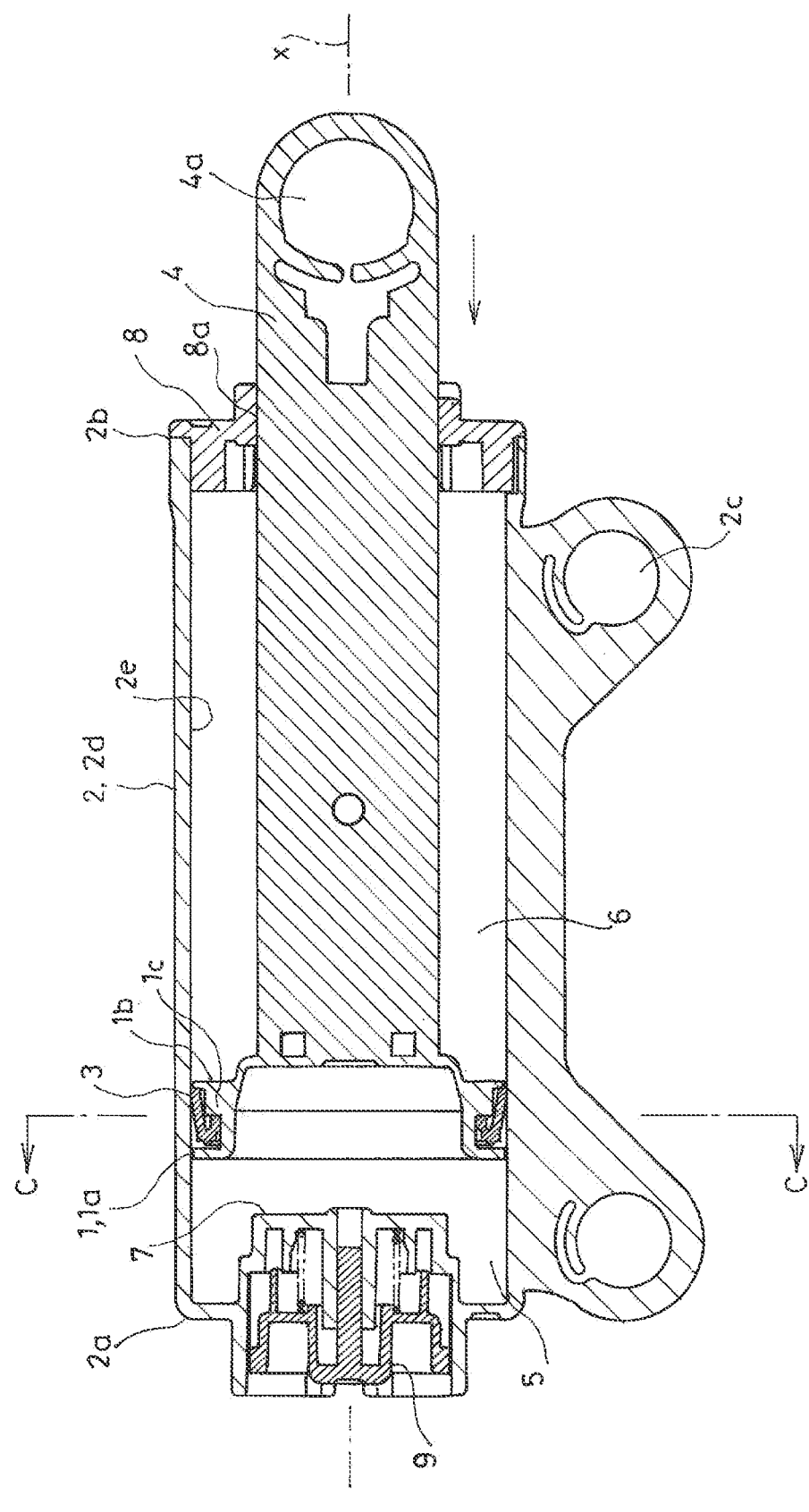
FIG. 5 is a sectional view at an A-A line in FIG. 8 of the damper device, wherein the piston member moves in a direction reducing one space.
Figure 6:
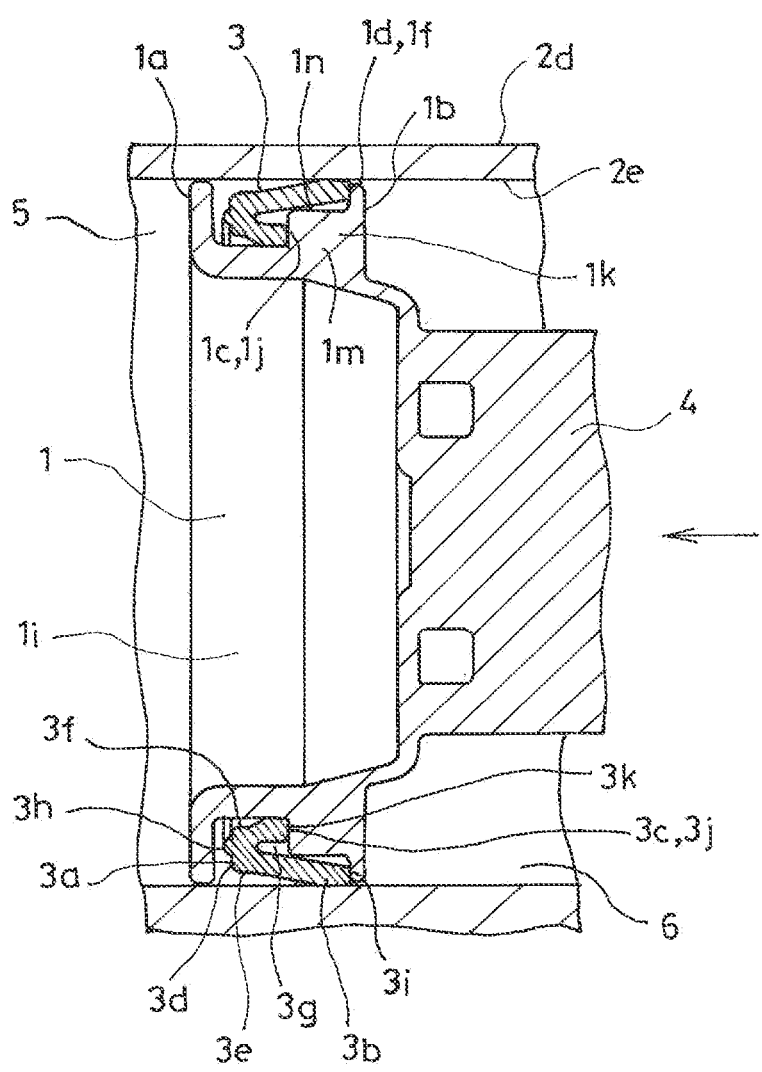
FIG. 6 is an enlarged view of a main part of FIG. 5.
Figure 7:
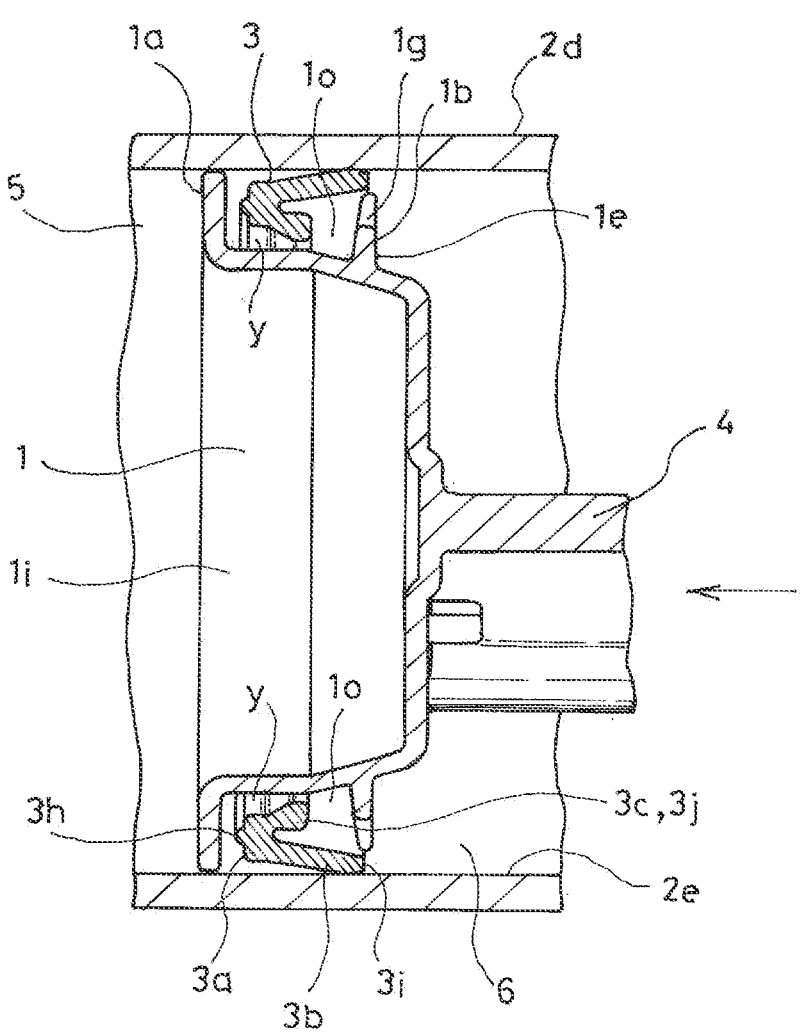
FIG. 7 is a main part sectional view at a B-B line in FIG. 8 of the damper device, wherein the piston member moves in the direction reducing the one space.
Figure 8:
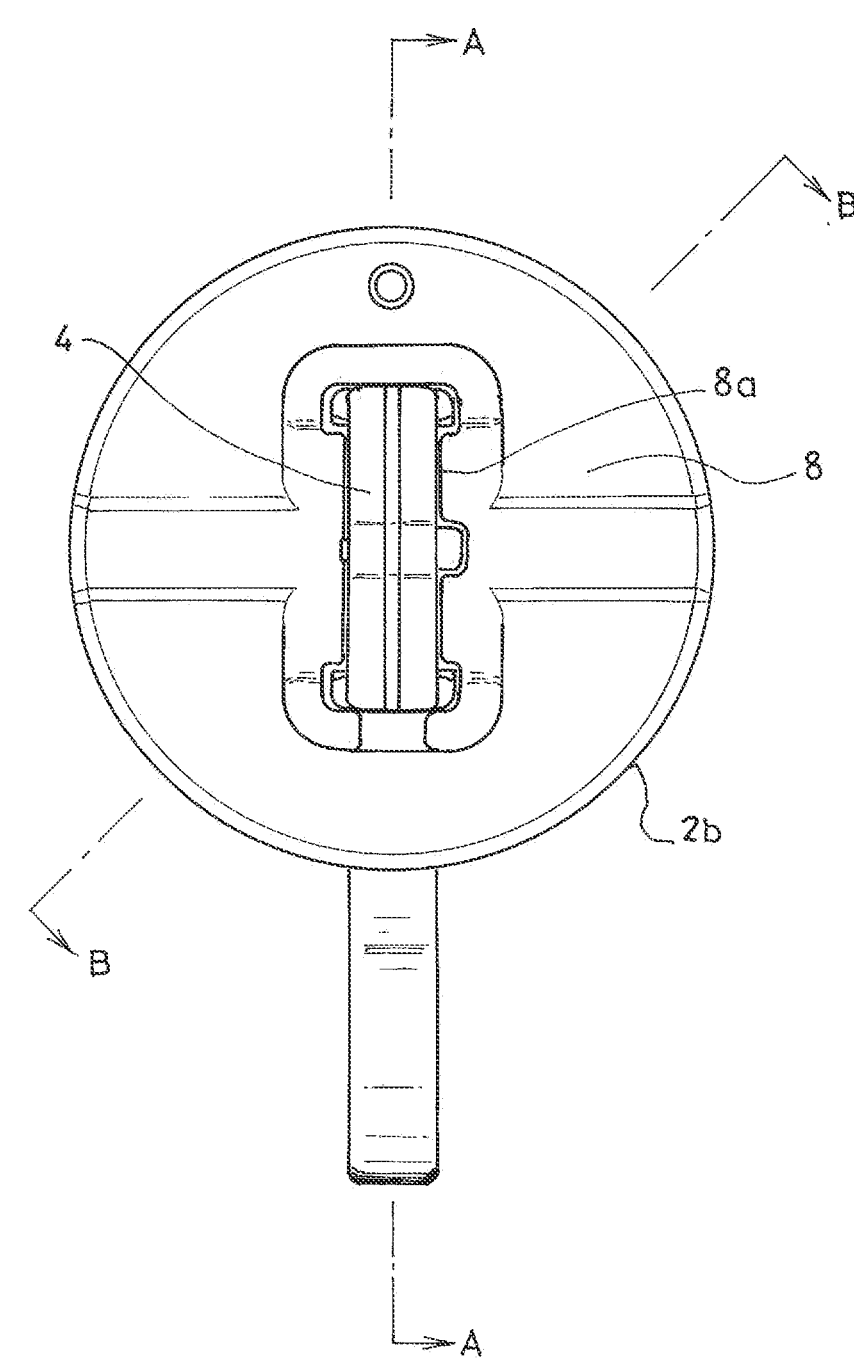
FIG. 8 is a side view showing the damper device from a right side of FIG. 5.
Figure 9:
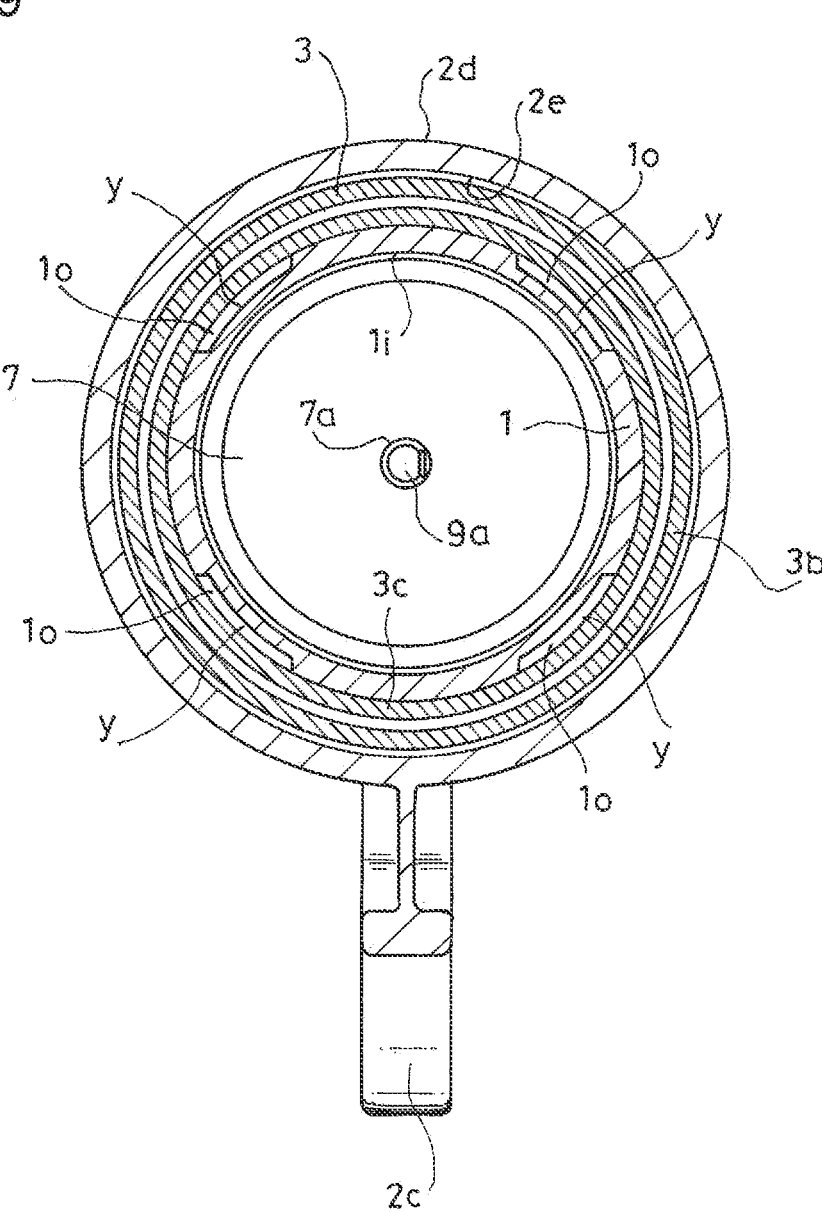
FIG. 9 is a sectional view at a C-C line in FIG. 5 of the damper device.

The seal member 3 has an annular shape surrounding the piston member 1, and includes a base portion 3a positioned on the one space 5 side in the cylinder member 2 divided by the piston member 1, and an extending portion 3b extending from the base portion 3a to the other space 6 side of the cylinder member 2 (refer to FIG. 6). The sectional shape of the seal member 3 along the movement center axis x (refer to FIG. 5) of the piston member 1 is substantially the same at any position surrounding the movement center axis x. Also, the seal member 3 is formed, typically, of a plastic with rubber or rubber type elasticity.

In the embodiment illustrated in FIG. 1 to FIG. 10, the seal member 3 includes, as shown in FIG. 6, an inner portion 3c, inside the extending portion 3b extending from the base portion 3a to the other space 6 side, which extends from the base portion 3a to the other space 6 side with an extending size smaller than the extending portion 3b. In the illustrated embodiment, the extending size of the inner portion 3c from the base portion 3a is substantially half of the extending size of the extending portion 3b from the base portion 3a.

In the illustrated embodiment, the base portion 3a includes a front end portion 3d forming a face substantially perpendicularly to the movement center axis x, an outer portion 3e facing, with a space, an inner wall 2e of a side portion 2d of the cylinder member 2, and an inner portion 3f facing a body 1i of the piston member 1 described later. An outer face of the extending portion 3b is continuous to the outer portion 3e, an outer face of the inner portion 3c is continuous to an inner portion 3f, and between the inner face of the extending portion 3b and the inner face of the inner portion 3c, there is formed a surrounding groove portion 3g with a bottom at a back side of the base portion 3a, i.e. the bottom facing the other space 6. Namely, the extending portion 3b and the inner portion 3c, both, have a cylindrical shape with a small height. The base portion 3a is formed to extend between a cylindrical end of the extending portion 3b and a cylindrical end of the inner portion 3c.

Also, the extending portion 3b protrudes from the base portion 3a such that as the extending portion 3b goes to the rear, an outer diameter of the seal member 3 gradually increases, and the inner portion 3c protrudes from the base portion 3a such that as the inner portion goes to the rear, an inner diameter of the seal member 3 gradually decreases.

In the configuration of the embodiment, in a condition where the extending portion 3b is elastically deformed slightly to the inside of the cylinder member 2, the extending end slidably contacts a side portion of the inner wall 25, to thereby seal the piston member 1 and the cylinder member 2. Also, at the time of the backward movement of the piston member 1, the extending portion 3b is likely to bend inward of the cylinder member 2, so that the sliding resistance at the time of the backward movement does not become excessive.

Also, in the configuration of the embodiment, a surrounding projection 3h is formed at the front end 3d of the base portion 3a, so that at a time of the forward movement of the piston member 1, the surrounding projection 3h pressure-contacts a first holding portion 1a, explaining later, of the piston member 1, to thereby seal between the seal member 3 and the piston member 1.

(Piston Member 1)

As shown in FIG. 6, the piston member 1 includes the first holding portion 1a facing the base portion 3a of the seal member 3, a second holding portion 1b facing an extending end 3i of the extending portion 3b, and a third holding portion 1c facing a held portion 3k of the seal member 3 formed on an inner side of the extending portion 3b.

In the illustrated embodiment, the piston member 1 is made in such a configuration that an outer diameter is smaller than an inner diameter of the cylinder member 2, and the respective holding portions 1a, 1b, 1c are formed outside a short cylindrical body wherein a cylindrical axis thereof coincides with the movement center axis x (refer to FIG. 5). A cylinder end on the one space 5 side of the piston member 1 is open, so that when the piston member 1 is moved to the end of the backward movement, the cylindrical projection 7b of the cylinder member 2 is housed in the piston member 1. A cylinder end on the other space 6 side is closed, and the closed portion is integrated with an inner end of the rod 4, explaining later.

The first holding portion 1a shows an outer brim shape surrounding an entire edge of the cylinder end at the one space 5 side of the piston member 1. An outer diameter of the first holding portion 1a is slightly smaller than the inner diameter of the cylinder member 2.

Figure 3:
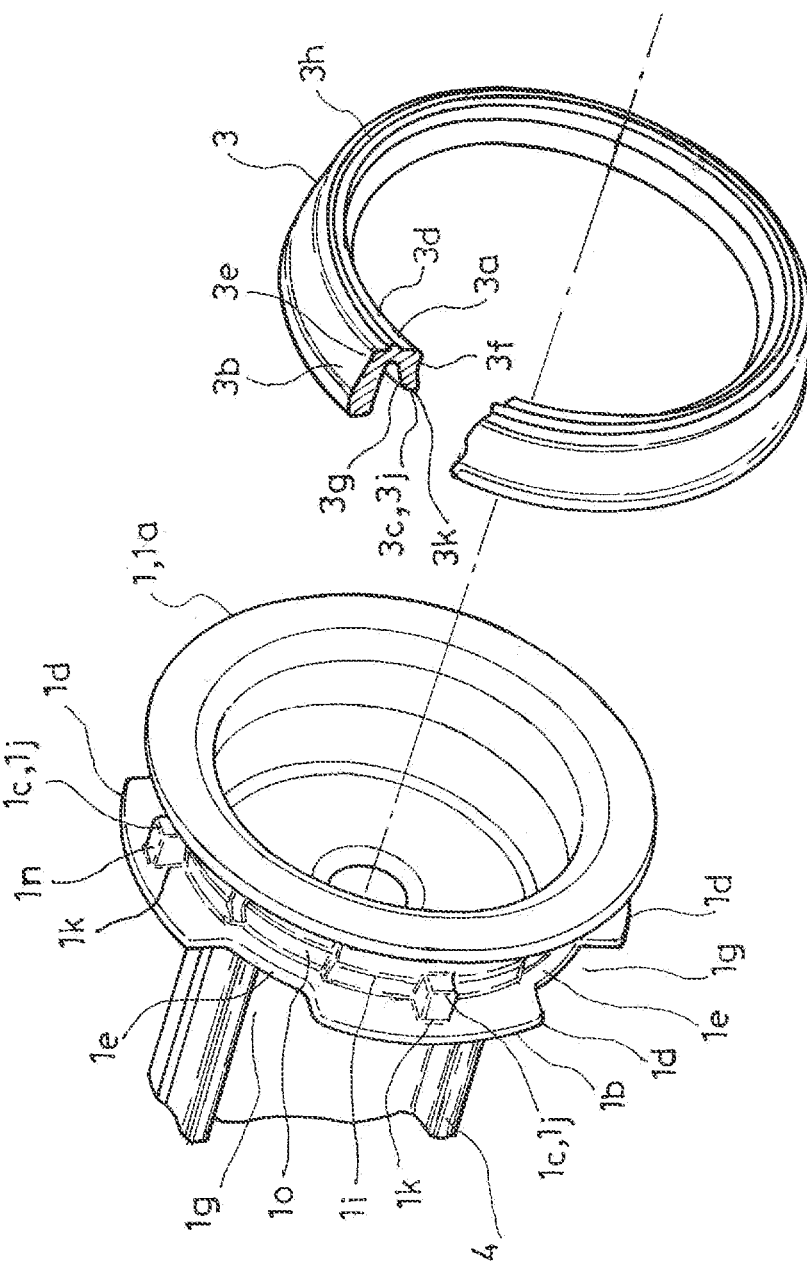
FIG. 3 is a perspective view showing a piston member and a seal member forming the damper device, separately.
Figure 4:
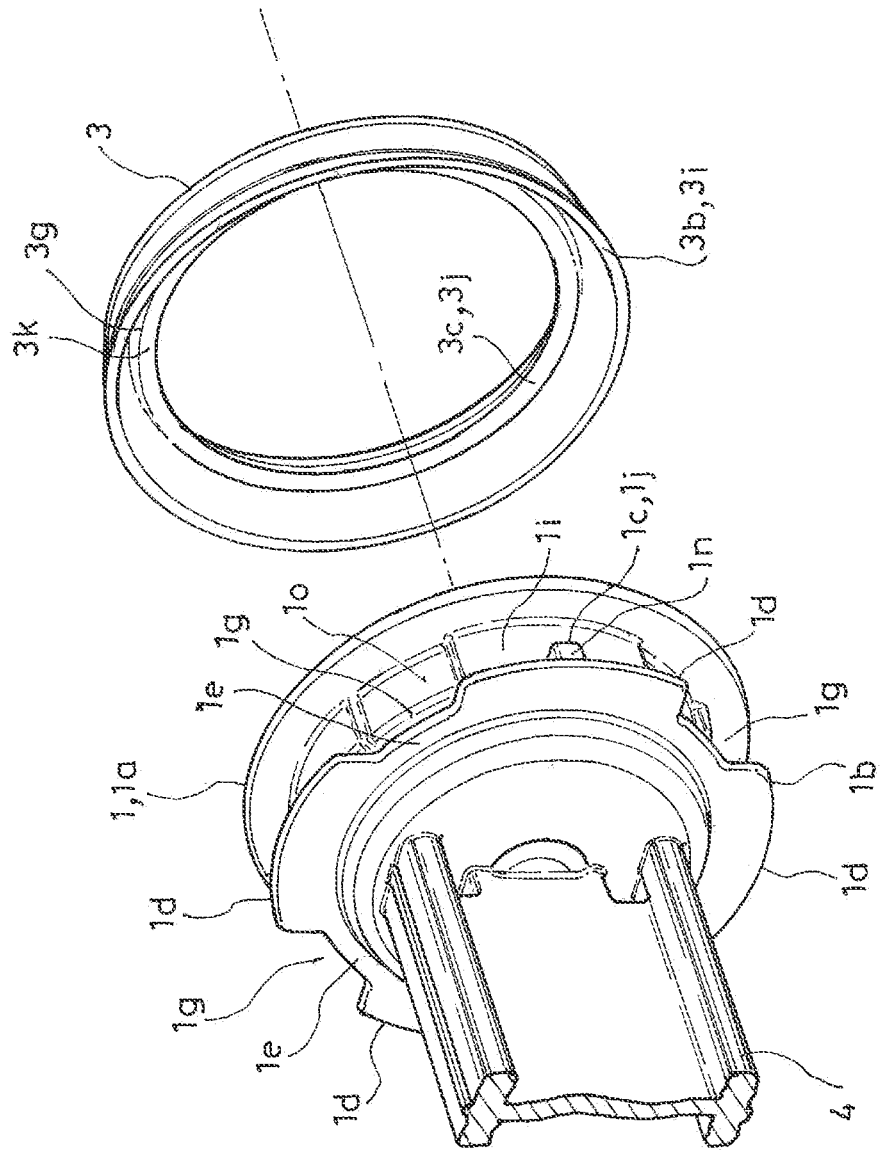
FIG. 4 is a perspective view showing the piston member and the seal member forming the damper device separately, from a direction different from FIG. 3.

The second holding portion 1b shows an outer brim shape surrounding an entire edge of the cylinder end at the other space 6 side of the piston member 1. In the illustrated embodiment, as shown in FIG. 3, the second holding portion 1b is formed such that wide width portions 1d where a protruding size is large, and reduced width portions 1e where a protruding size is small are alternately formed in the direction surrounding the movement center axis x. In the illustrated embodiment, four wide width portions 1d and four reduced width portions 1e are respectively formed. A protruding edge if of the second holding portion 1b (refer to FIG. 6) is formed to follow an arc of an imaginary circle (not shown in the drawings) around the movement center axis x as a center. A diameter of the imaginary circle where the protruding edges if of the four large width portions 1d are arranged is slightly smaller than the inner diameter of the cylinder member 2. By the four reduced width portions 1e, passing portions 1g for smoothly passing a fluid between the adjacent wide width portions 1d in the direction surrounding the movement center axis x are formed (refer to FIG. 3). Each wide width portion 1d is formed in a range corresponding to an arc of a center angle 20 degrees to 70 degrees in an imaginary circle around the movement center axis x. Accordingly, the second holding portion 1b is formed with one or two fluid passing portions 1g, in the illustrated embodiment, more than two passing portions 1g.

Incidentally, in the illustrated embodiment, the passing portion 1g is formed by the reduced width portion 1e. However, the passing portion 1g may be formed without providing an outer collar portion between the wide width portions 1d.

Figure 11:
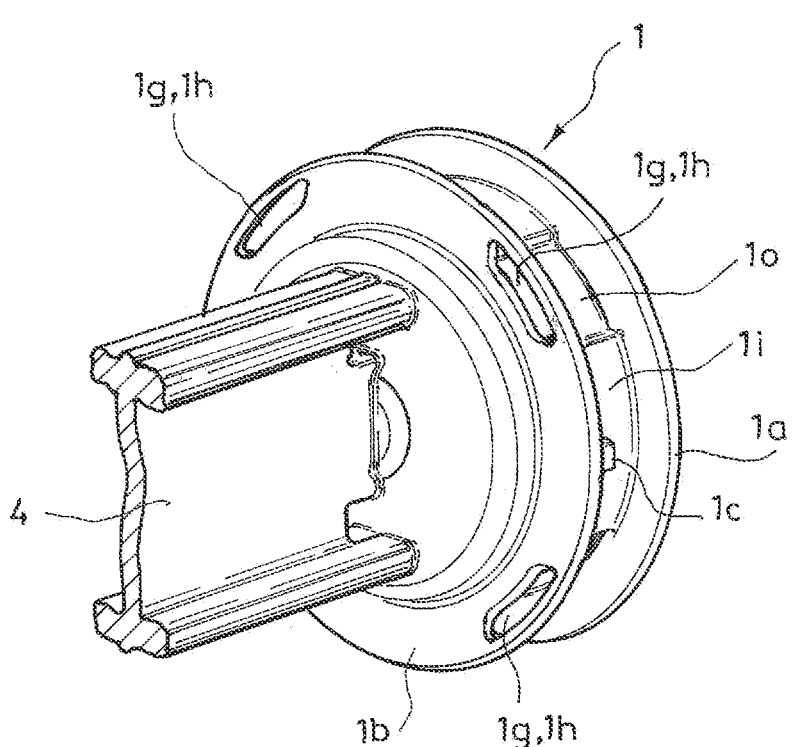
FIG. 11 is a perspective diagram showing that a part of the structure of the piston member of the damper device shown in FIGS. 1-10 is changed.

Also, as shown in FIG. 11, a passing portion 1g may be formed by a hole 1h formed in the second holding portion 1b forming an outer collar portion.

As shown in FIG. 3, the third holding portions 1c are each formed at a portion (hereinafter, this portion is called as a body portion 1i) between the first holding portion 1a and the second holding portion 1b in the piston member 1. The third holding portion 1c is formed as a protruding portion protruding from an outer surface of the body portion 1i in a direction perpendicular to the movement center axis x. The third holding portion 1c includes a front end 1j in a step form directed to a face facing the other space 6 side in the first holding portion 1a, a rear end 1k integrated with a face directed to the one space 5 side in the wide width portion 1d of the second holding portion 1b, a bottom 1m integrated with the body portion 1i, and a top 1n facing an inner wall of the cylinder member 2 (refer to FIG. 6).

A distance between the first holding portion 1a and the second holding portion 1b is slightly longer that a distance between the surrounding projection 3h of the seal member 3 and an extending end 3i of the extending portion 3b.

A distance between the first holding portion 1a and a front end 1j of the third holding portion 1c is slightly longer than a distance between the surrounding projection 3h of the seal member 3 and the extending end 3j of the inner portion 3c.

An outer diameter of the body portion 1i is substantially the same or slightly greater than a diameter of the outer face side of the inner portion 3c of the seal member 3 (namely, the inner diameter of the seal member 3).

A top 1n of the third holding portion 1c is located on the movement center axis x side more than the protruding edge if of the wide width portion 1d of the second holding portion 1b.

The third holding portion 1c shows a plate shape with a thickness in a direction surrounding the movement center axis x, and is formed at a position which is a middle in the surrounding direction around the movement center axis x in the wide width portion 1d.

Also, on the outer face side of the body portion 1i of the piston member 1, dents 1o forming fluid paths y (refer to FIG. 9) of the fluid relative to the seal member 3 are formed to continue to the passing portions 1g. In the illustrated embodiment, the dent 1o which has a dent width substantially the same length as the reduced width portion 1e in the surrounding direction around the movement center axis x is formed between the first holding portion 1a and the second holding portion 1b, so that the dent 1o and the passing portion 1g continue.

Accordingly, in the illustrated embodiment, the seal member 3 is retained in a condition that the inner portion 3c of the seal member 3 can slightly move in the direction along the movement center axis x between the first holding portion 1a and the third holding portion 1c. Also, while the outer surface of the inner portion 3c closely contacts the outer surface of the body portion 1i except for the portions where the dents 1o are formed, at the portions where the dents 1o are formed, the fluid paths y for the fluid are formed with respect to the seal member 3 (refer to FIG. 9). Also, the extending end 3j of the inner portion 3c of the seal member 3 faces the front end 1j of the third holding portion 1c.

Namely, in the embodiment shown in FIG. 1 to FIG. 10, the extending end 3*j* of the inner portion 3*c* of the seal member 3 operates as the held portion 3*k* formed inside the extending portion 3*b*.

Figure 12:
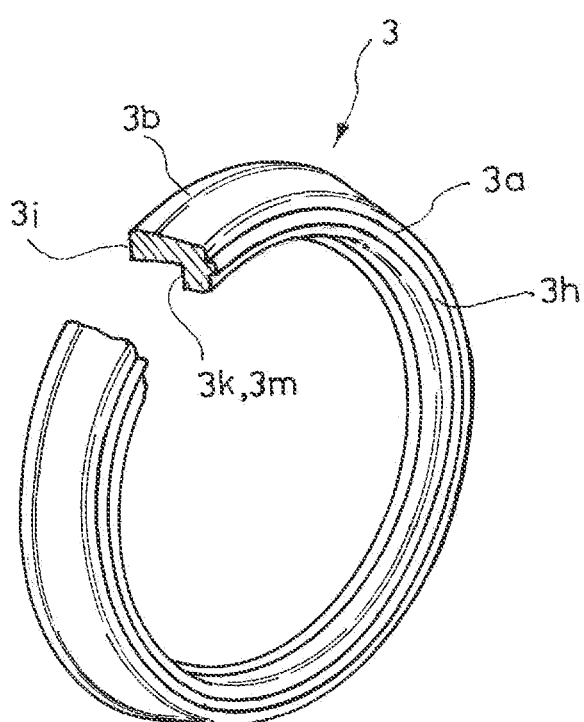
FIG. 12 is a perspective diagram showing that a part of the structure of the seal member of the damper device shown in FIGS. 1-10 is changed.

Incidentally, as shown in FIG. 12, the held portion 3*k* may be formed inside the extending portion 3*b* by forming a surrounding step face 3*m* facing the extending end 3*i* of the extending portion 3*b*. In the embodiment illustrated in FIG. 12, the seal member 3 does not have the inner portion 3*c*.

(Rod Member 4)

In the illustrated embodiment, as shown in FIG. 5, the rod member 4 has a long stick shape in a moving direction of the piston member 1. At an outer end of the rod member 4 located outside the cylinder member 2, a connecting member 4*a* for connection is formed.

At the forward movement of the piston member 1 where the one space 5 is enlarged, as shown in FIG. 10, the extending portion 3*b* of the seal member 3 contacts the inner wall 2*e* of the side portion 2*d* of the cylinder member 2, and the surrounding projection 3*h* of the base portion 3*a* of the seal member 3 contacts the first holding portion 1*a*, so that it is possible to seal between the cylinder member 2 and the piston member 1, while, inflow of the fluid into the space 5 is limited to the passing hole 7*a* to thereby provide a braking force based on the forward movement of the piston member 1.

At the backward movement of the piston member 1, as shown in FIG. 6, since the base portion 3*a* of the seal member 3 and the first holding portion 1*a* can be separated, it is possible to permit, through the piston member 1 and the seal member 3, movement of the fluid from the one space 5 to the other space 6. At this time, the extending end 3*i* of the extending portion 3*b* of the seal member 3 is held by the second holding portion 1*b*, and the held portion 3*k* is held by the third holding portion 1*c*, respectively. Accordingly, a situation where an unexpected sliding resistance between the seal member 3 and the cylinder member 2 by a deformation of the seal member 3 is possibly prevented.

Especially, in the embodiment shown in FIG. 1 to FIG. 10, rigidity of the seal member 3 is increased by the inner portion 3*c* shortening an extending size of the seal member 3 from the base portion 3*a*, so that the above situation is more effectively prevented.

On the other hand, since the passing portions 1*g* are formed in second holding portion 1*b*, the movement of the fluid from the one space 5 to the other space 6 can be smoothly made, and the backward movement of the piston member 1 can be made with less resistance. Namely, the damper device of the embodiment operates as, so called, a one way damper device which can substantially provide a braking force only at the time of the forward movement.

Especially, in the damper device of the embodiment, the inner portion 3*c* of the seal member 3 is stably supported at the body portion 1*i* other than the portions where the dents 1*c* of the body portion 1*i* of the piston member 1 are formed, while at the portions other than the above portions, portions between the inner portion 3*c* of the seal member 3 and the body portion 1*i* of the piston member 1 become fluid paths y of the fluid continuing the passing portions 1*g*. Thus, outflow of the fluid from the one space 5 is effectively made.

Incidentally, naturally, the present invention is not limited to the above embodiments, and the invention includes all the embodiments which can achieve the object of the invention.

EXPLANATION OF NUMERALS

1 Piston member
1*a* First holding portion

1*b* Second holding portion
1*c* Third holding portion
1*g* Passing portion
2 Cylinder member
3 Seal member
3*a* Base portion
3*b* Extending portion
3*i* Extending end
3*k* Held portion
5 One space
6 Other space Incidentally, the entire contents of the specification, claims, drawings and abstract of Japanese Patent Application No. 2021-027046 filed on Feb. 24, 2021 are cited herein and introduced as the disclosure of the specification of the invention.

What is claimed is:

1. A damper device comprising: a piston member, a cylinder member housing the piston member, and a seal member sealing between the piston member and the cylinder member, and forming a braking force by a movement or a relative movement of the piston member,
   wherein the piston member divides a first space and a second space in the cylinder member,
   the seal member has an annular shape surrounding the piston member, and includes a base portion located in a first space side of the cylinder member, and an extending portion extending from the base portion to a second space side of the cylinder member,
   the piston member includes
      a first holding portion facing the base portion of the seal member,
      a second holding portion facing an extending end of the extending portion of the seal member,
      a third holding portion facing a held portion formed at an inner side of the extending portion of the seal member, and
      a plurality of projections spaced apart from each other projecting, between the first holding portion and the second holding portion, from the piston member in a direction orthogonal to a moving central axis of the piston member, wherein
   the second holding portion is formed with one or more than two passing portions of the fluid, and
   the third holding portion includes a surface of the projection facing the first holding portion.

2. A damper device according to claim 1, wherein a dent forming a flow path of the fluid relative to the seal member is formed to continue to the passing portion at a portion between the first holding portion and the second holding portion in the piston member.

3. A damper device according to claim 1, wherein the first space of the cylinder member becomes a high pressure at a time that the piston member moves in a direction to reduce the first space.

4. The damper device according to claim 1,
   wherein the third holding portion includes:
      a front end in a step form directed to a face facing the second space side in the first holding portion,
      a rear end integrated with a face directed to the first space side in a wide width portion of the second holding portion,
      a bottom integrated with a part of the piston member, and
      a top facing an inner wall of the cylinder member.

5. The damper device according to claim 4,
wherein a top of the third holding portion is located on the movement center axis side more than the protruding edge of the wide width portion of the second holding portion.

\*   \*   \*   \*   \*